(12) United States Patent
Kim et al.

(10) Patent No.: US 7,679,711 B2
(45) Date of Patent: Mar. 16, 2010

(54) LCD DEVICE HAVING A FIRST PANEL WITH A FLAT SURFACE PLATE-LIKE PORTION AND A BAR LIKE SECOND PORTION, WITH A SPACER BETWEEN THE FIRST AND A SECOND PANEL CONTACTING THE FLAT SURFACE PLATE-LIKE FIRST PORTION, AND OVERLAPPING PIXEL ELECTRODE WITHOUT OVERLAPPING SIGNAL LINES DISPOSED IN THE BAR-LIKE SECOND PORTION

(75) Inventors: Dong-Gyu Kim, Yongin-si (KR); Ho-Kyoon Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 864 days.

(21) Appl. No.: 11/206,516

(22) Filed: Aug. 18, 2005

(65) Prior Publication Data

US 2006/0048473 A1    Mar. 9, 2006

(30) Foreign Application Priority Data

Aug. 19, 2004    (KR) ...................... 10-2004-0065389

(51) Int. Cl.
*G02F 1/1339*    (2006.01)
(52) U.S. Cl. ..................................... 349/155; 349/156
(58) Field of Classification Search ................. 349/155, 349/156

See application file for complete search history.

(56) References Cited

U.S. PATENT DOCUMENTS

| 5,748,266 | A  | * | 5/1998 | Kodate ........................ 349/39 |
| 5,917,572 | A  | * | 6/1999 | Kurauchi et al. ............ 349/156 |
| 6,181,406 | B1 |   | 1/2001 | Morimoto |
| 6,774,974 | B1 |   | 8/2004 | Matsuyama |
| 2005/0140914 | A1 | * | 6/2005 | Sawasaki et al. ............ 349/155 |

FOREIGN PATENT DOCUMENTS

| JP | 09304781 | 11/1997 |
| JP | 2001201752 | 7/2001 |
| JP | 2002196338 | 7/2002 |
| JP | 2002341329 | 11/2002 |
| JP | 2003075808 | 3/2003 |
| JP | 2003280000 | 10/2003 |
| KR | 1020020015834 | 3/2002 |
| KR | 1020030052053 | 6/2003 |
| KR | 1020030093789 | 12/2003 |
| KR | 1020040040086 | 5/2004 |

* cited by examiner

*Primary Examiner*—John Heyman
(74) *Attorney, Agent, or Firm*—Cantor Colburn LLP (57) ABSTRACT

A liquid crystal display device according to an exemplary embodiment includes: a first panel comprising a first portion and a second portion, wherein the first portion has a height lower than of the second portion; a second panel facing the first panel; a spacer disposed between the first panel and the second panel and contacting the first portion of the first panel; and a liquid crystal layer disposed between the first panel and the second panel.

13 Claims, 7 Drawing Sheets

LCD DEVICE HAVING A FIRST PANEL WITH A FLAT SURFACE PLATE-LIKE PORTION AND A BAR LIKE SECOND PORTION, WITH A SPACER BETWEEN THE FIRST AND A SECOND PANEL CONTACTING THE FLAT SURFACE PLATE-LIKE FIRST PORTION, AND OVERLAPPING PIXEL ELECTRODE WITHOUT OVERLAPPING SIGNAL LINES DISPOSED IN THE BAR-LIKE SECOND PORTION

BACKGROUND OF THE INVENTION (a) Field of the Invention

The present invention relates to a liquid crystal display device.

(b) Description of Related Art

A liquid crystal display (LCD) device is one of the most widely used flat panel display devices. An LCD device includes two panels provided with field-generating electrodes such as pixel electrodes and a common electrode and a liquid crystal (LC) layer interposed therebetween. The LCD device displays images by applying voltages to the field-generating electrodes to generate an electric field in the LC layer, which determines orientations of LC molecules in the LC layer to adjust polarization of incident light.

The LCD device further includes thin film transistors (TFTs) and a plurality of signal lines for transmitting signals to the TFTs, which include gate lines transmitting gate signals, data lines transmitting data signals, and storage electrode lines supplied with a common voltage and overlapping the pixel electrodes.

The LCD device further includes a plurality of spacers forming a gap filled with the LC layer. The spacers include bead spacers irregularly spread over the panels and columnar spacers or rigid spacers regularly arranged on the panels.

The columnar spacers are usually formed of a photoresist film by coating, light exposure, and development. The columnar spacers are usually disposed on opaque members such as the signal lines and the thin film transistors.

The LCD device is often subjected to pressure or impact. The impact may make the columnar spacers slide out of their initial positions, and the spacers try to recover their positions due to their elasticity.

However, the spacers may not return to their initial positions and may remain at the distorted positions if there are obstacles such as steps in the returning path. Consequently, the orientations of the LC molecules near the spacers may be distorted and cause light leakage.

SUMMARY OF THE INVENTION

A liquid crystal display device according to an exemplary embodiment includes: a first panel comprising a first portion and a second portion, wherein the first portion has a height lower than of the second portion; a second panel facing the first panel; a spacer disposed between the first panel and the second panel and contacting the first portion of the first panel; and a liquid crystal layer disposed between the first panel and the second panel.

In another exemplary embodiment, the spacer may be formed on the second panel and may be disposed near the second portion of the first panel. Additionally, the second portion of the first panel may be opaque. Furthermore, the second portion of the first panel may enclose the first portion of the first panel.

The first portion of the first panel may include a pixel electrode and the second portion of the first panel may include a signal line. The second panel may include a common electrode generating an electric field in cooperation with the pixel electrode.

The second panel may further include a light blocking member that faces the second portion of the first panel and partly faces the first portion of the first panel and the spacer may overlap the light blocking member.

The pixel electrode and the common electrode may be transparent.

The liquid crystal display device may further include a plurality of color filters disposed on either the first panel or the second panel. The color filters may include a red filter, a green filter, and a blue filter and the spacer may overlap the blue filter.

The first portion of the first panel may include a plate-like conductor and the second portion of the first panel comprises a bar-like conductor.

A liquid crystal display device according to another exemplary embodiment includes: a first panel including a first substrate, a plurality of signal lines disposed on the first substrate, a plurality of thin film transistors connected to the signal lines, and a plurality of pixel electrodes connected to the thin film transistors; a second panel facing the first panel; a plurality of spacers that are disposed between the first panel and the second panel, face the pixel electrodes, and are disposed near the signal lines without overlapping the signal lines; and a liquid crystal layer disposed between the first panel and the second panel.

The signal lines may include a plurality of gate lines, a plurality of data lines traversing the gate lines, and a plurality of storage electrode lines overlapping the pixel electrodes.

The liquid crystal display device may further include a plurality of color filters disposed on one of the first and the second panels. The color filters may include a red filter, a green filter, and a blue filter and the spacers overlap the blue filters.

A liquid crystal display device according to another embodiment of the present invention includes: a first panel including a first substrate, a plurality of signal lines disposed on the first substrate, a plurality of thin film transistors connected to the signal lines, and first and second pixel electrodes connected to the thin film transistors and having substantially the same shape; a second panel facing the first panel and including a light blocking member that includes a first opening facing the first pixel electrodes and a second opening facing the second pixel electrodes and having a small area than the first opening; a plurality of spacers that are disposed on the light blocking member, contact the first panel, and face the second pixel electrodes; and a liquid crystal layer disposed between the first panel and the second panel.

BRIEF DESCRIPTION OF THE DRAWINGS

The present invention will become more apparent by describing exemplary embodiments thereof in more detail with reference to the accompanying drawing in which.

DETAILED DESCRIPTION OF THE INVENTION

The present invention now will be described more fully hereinafter with reference to the accompanying drawings, in which exemplary embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

An LCD device according to an exemplary embodiment of the present invention will be described in detail with reference to FIGS. 1, 2 and 3.

Figure 1:
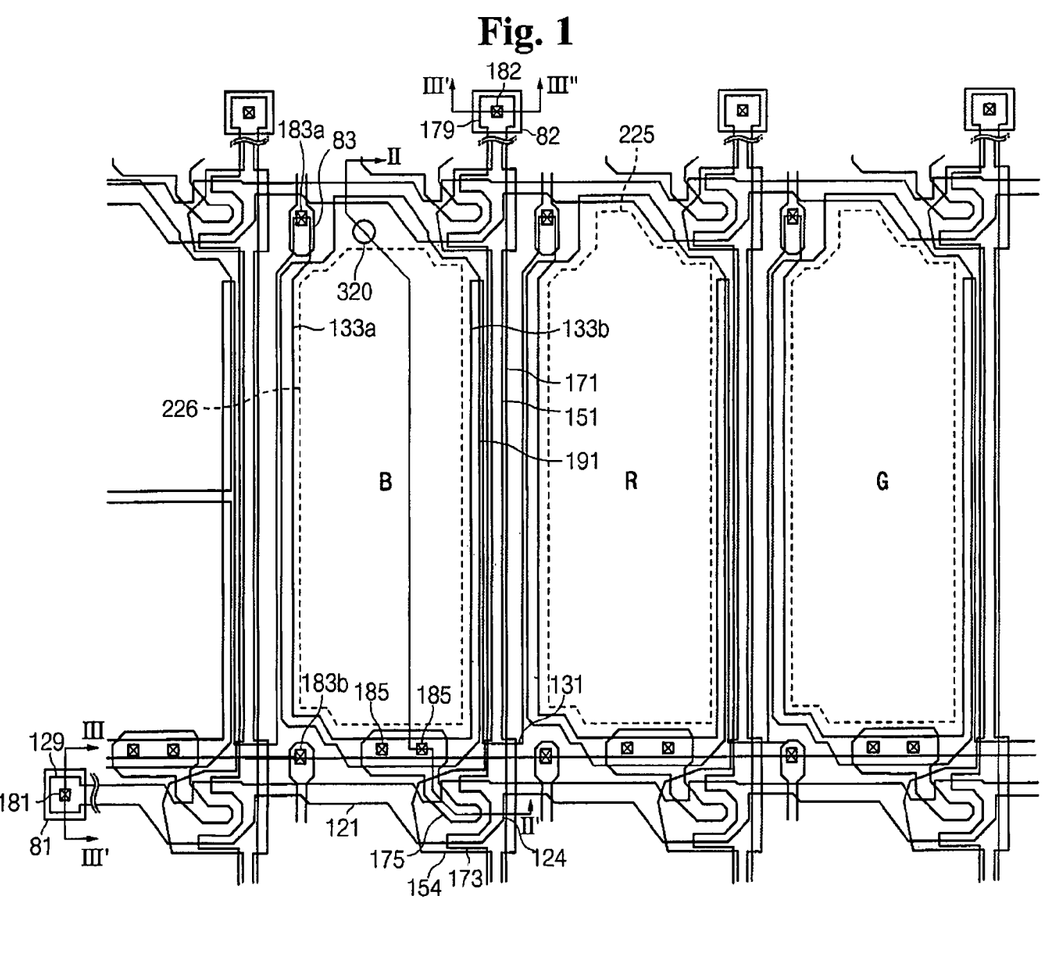
FIG. 1 is a layout view of a TFT array panel according to an exemplary embodiment of the present invention.
Figure 2:
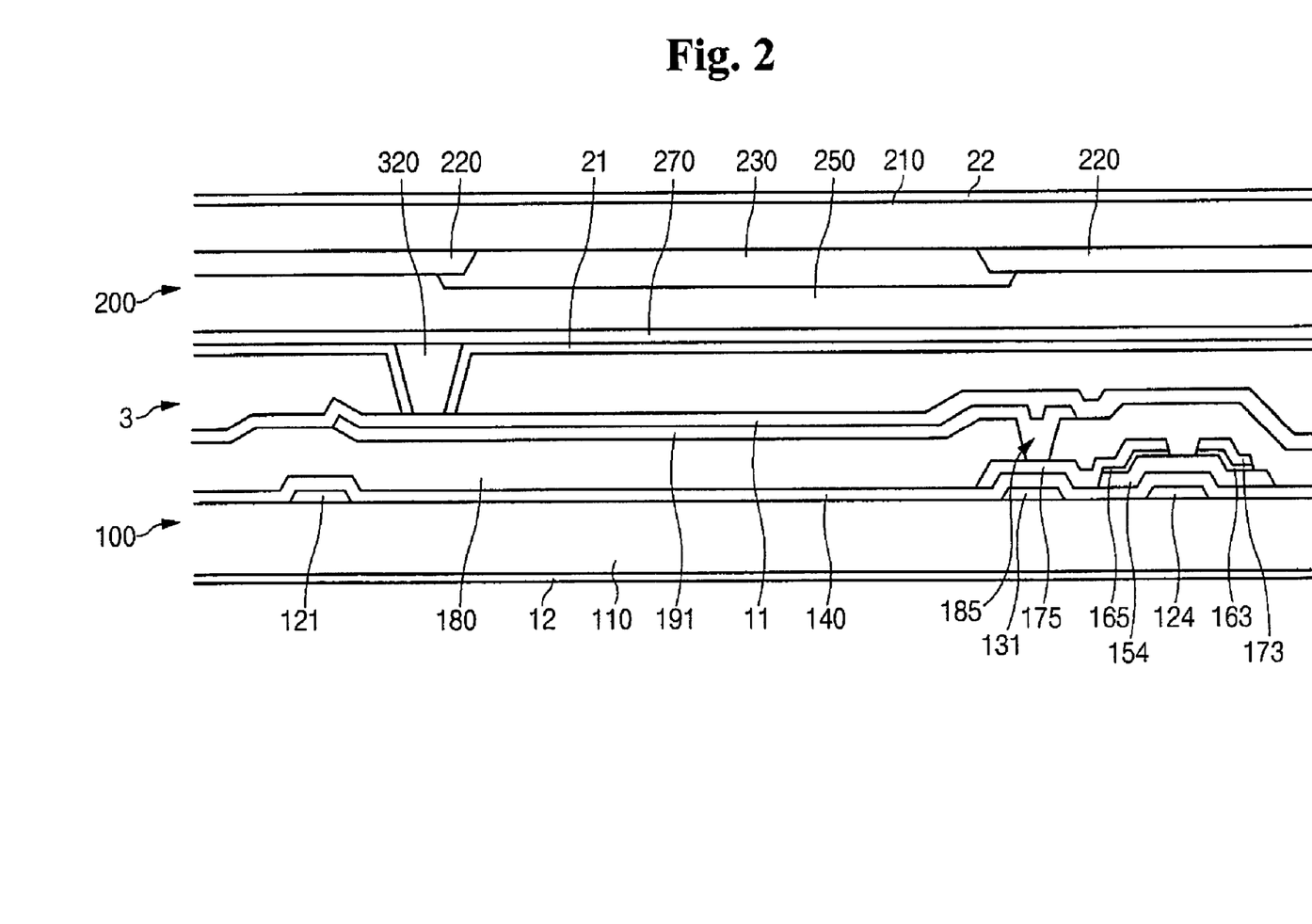
FIG. 2 is a sectional view of the TFT array panel shown in FIG. 1 taken along line II-II.
Figure 3:
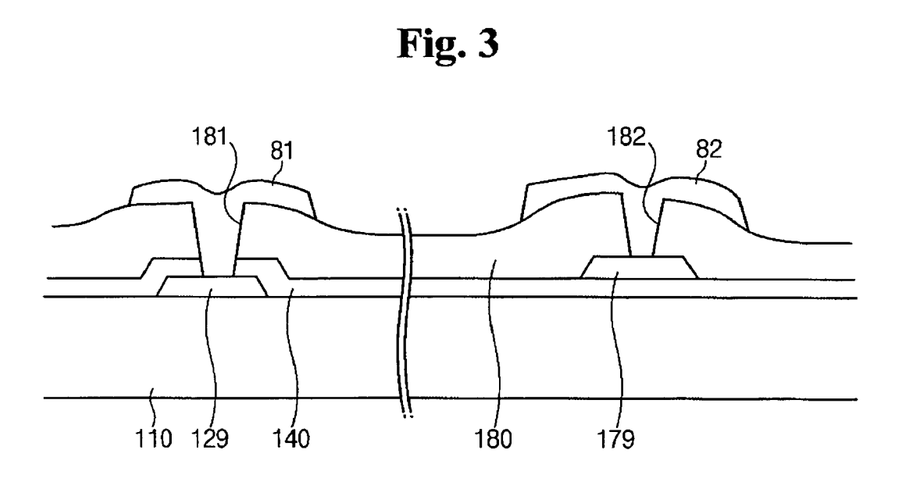
FIG. 3 is a sectional view of the TFT array panel shown in FIG. 1 taken along line III-III'-III"

FIG. 1 is a layout view of an LCD device according to an exemplary embodiment of the present invention, and FIGS. 2 and 3 are sectional views of the LCD device shown in FIG. 1 taken along lines II-II' and III-III'-III", respectively.

Referring to FIGS. 1-3, an LCD device according to an exemplary embodiment of the present invention includes a TFT array panel 100, a common electrode panel 200, and a LC layer 3 interposed between the TFT array panel 100 and the common electrode panel 200.

The TFT array panel 100 will be described in further detail.

A plurality of gate lines 121 and a plurality of storage electrode lines 131 are formed on an insulating substrate 110, which may be constructed of transparent glass or plastic.

A gate line 121 transmits a gate signal and extends substantially in a transverse direction. The gate line 121 includes a gate electrodes 124 projecting downward and an end portion 129 having a large area for contact with another layer or an external driving circuit. A gate driving circuit (not shown) for generating the gate signal may be mounted on a flexible printed circuit (FPC) film (not shown), which may be attached to the substrate 110, directly mounted on the substrate 110, or integrated onto the substrate 110. The gate line 121 may extend to be connected to a driving circuit (not shown) that may be integrated on the substrate 110.

A storage electrode line 131 is supplied with a predetermined voltage and each includes a stem extending substantially parallel to the gate line 121 and a pair of first and second storage electrodes 133a and 133b extending in a longitudinal direction from the stem. The storage electrode line 131 is disposed between two adjacent gate lines 121 and the stem is close to a lower one of the two adjacent gate lines 121. Each of the first and second storage electrodes 133a and 133b is shaped like a straight bar and has a fixed end portion connected to the stem and a free end portion disposed opposite thereto and disposed near the gate line 121. Since the gate electrode 124 projects downward, the fixed end portion of the first storage electrode 133a faces the gate electrode 124 along the transverse direction and the second storage electrode 133b is shorter than the first storage electrode 133a. However, it will be appreciated that the storage electrode line 131 may have various shapes and arrangements.

In an exemplary embodiment, the gate line 121 and the storage electrode line 131 are made of, including but not limited to, Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, the gate line 121 and the storage electrode line 131 may have a multi-layered structure including two conductive films (not shown) that have different physical characteristics. One of the two conductive films is made of, including but not limited to, low resistivity metal including Al containing metal, Ag containing metal, and Cu containing metal for reducing signal delay or voltage drop. The other conductive film is made of, including but not limited to, material such as Mo containing metal, Cr, Ta, or Ti, which has good physical, chemical, and electrical contact characteristics with other materials such as indium tin oxide (ITO) or indium zinc oxide (IZO). Examples of the combination of the two films are a lower Cr film and an upper Al (alloy) film and a lower Al (alloy) film and an upper Mo (alloy) film. However, it is contemplated that the gate line 121 and the storage electrode line 131 may also be made of various metals or conductors.

The lateral sides of the gate line 121 and the storage electrode line 131 are inclined relative to a surface of the substrate 110, and the inclination angle thereof ranges from about 30 degrees to about 80 degrees.

A gate insulating layer 140, made of, including but not limited to, silicon nitride (SiNx) or silicon oxide (SiOx), is formed on the gate line 121 and the storage electrode line 131. However, it is contemplated that the insulating layer 140 may be of any other suitable material.

A plurality of semiconductor stripes 151, made of, including but not limited to, hydrogenated amorphous silicon (abbreviated to "a-Si") or polysilicon, are formed on the gate insulating layer 140. A semiconductor stripe 151 extends substantially in the longitudinal direction and become wide near the gate lines 121 and the storage electrode lines 131 such that the semiconductor stripe 151 covers a large area of the gate line 121 and the storage electrode line 131. The semiconductor stripes 151 includes a projection 154 branched out toward the gate electrode 124.

A plurality of ohmic contact stripes and ohmic contact islands 165 are formed on the semiconductor stripes 151. The ohmic contact stripes and islands 165 are made of, including but not limited to, n+ hydrogenated a-Si heavily doped with n type impurity such as phosphorous or they may be made of silicide. Each ohmic contact stripe includes a projection 163. The projection 163 and an ohmic contact island 165 are located in pairs on the projection 154 of the semiconductor stripe 151.

The lateral sides of the semiconductor stripe 151 and the ohmic contact stripe and island 165 are inclined relative to the surface of the substrate 110, and the inclination angles thereof are in a range, including but not limited to, from about 30 degrees to about 80 degrees.

A data line 171 and a drain electrode 175 are formed on the ohmic contacts stripes and island 165 and the gate insulating layer 140.

The data line 171 transmits data signals and extends substantially in the longitudinal direction to traverse the gate line 121 and the storage electrode line 131. The data line 171 also traverse the storage electrode line 131 and runs between adjacent pairs of storage electrodes 133a and 133b. The data line 171 includes a plurality of source electrodes 173 each projecting toward the gate electrode 124 and an end portion 179 having a large area for contact with another layer or an external driving circuit. The data line 171 may be curved in shape, for example, in a particular exemplary embodiment the data line 171 may have a shape similar to the character J. A data driving circuit (not shown) for generating the data signal may be mounted on a FPC film (not shown), which may be attached to the substrate 110, directly mounted on the substrate 110, or integrated onto the substrate 110. The data line 171 may extend to be connected to a driving circuit that may be integrated on the substrate 110.

The drain electrode 175 is separated from the data line 171 and disposed opposite the source electrode 173 with respect to the gate electrode 124. The drain electrode 175 includes a wide end portion and a narrow end portion. The wide end portion overlaps the storage electrode line 131 and the narrow end portion is partly enclosed by the source electrode 173.

The gate electrode 124, the source electrode 173, and the drain electrode 175 along with the projection 154 of the semiconductor stripe 151 form a TFT having a channel formed in the projection 154 disposed between the source electrode 173 and the drain electrode 175.

The data line 171 and the drain electrode 175 are made of, including but not limited to, refractory metal such as Cr, Mo, Ta, Ti, or alloys thereof. However, the data line 171 and the drain electrode 175 may have a multilayered structure including a refractory metal film (not shown) and a low resistivity film (not shown). Examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, it is contemplated that the data line 171 and the drain electrode 175 may be made of various metals or conductors.

The data line 171 and the drain electrode 175 have inclined edge profiles, and the inclination angles thereof range from about 30 degrees to about 80 degrees.

The ohmic contacts stripe and island 165 are interposed between the underlying semiconductor stripe 151 and the overlying conductors 171 and 175 thereby reducing the contact resistance therebetween. Although the semiconductor stripe 151 is generally narrower than the data line 171, the width of the semiconductor stripe 151 becomes larger near the gate line 121 and the storage electrode line 131 as described above, to smooth the profile of the surface, thereby preventing the disconnection of the data line 171. The semiconductor stripe 151 includes some exposed portions, which are not covered with the data line 171 and the drain electrode 175, such as portions located between the source electrode 173 and the drain electrode 175.

A passivation layer 180 is formed on the data line 171, the drain electrode 175, and the exposed portions of the semiconductor stripe 151. The passivation layer 180 is made of, including but not limited to, an inorganic or organic insulator and it may have a flat top surface. Examples of the inorganic insulator include silicon nitride and silicon oxide. The organic insulator may have photosensitivity and dielectric constant less than about 4.0. The passivation layer 180 may include a lower film made of inorganic insulator and an upper film made of organic insulator such that it takes the excellent insulating characteristics of the organic insulator while preventing the exposed portions of the semiconductor stripe 151 from being damaged by the organic insulator.

The passivation layer 180 has a first contact hole 182 and a second contact hole 185 exposing the end portion 179 of the data line 171 and the drain electrode 175, respectively. The passivation layer 180 and the gate insulating layer 140 have a third hole 181 exposing the end portion 129 of the gate line 121, a fourth contact hole 183a exposing portions of the storage electrode line 131 near the fixed end portions of the storage electrode 133a, and a fifth contact hole 183b exposing the free end portions of the storage electrode 133a.

A plurality of pixel electrodes 191, a plurality of overpasses 83, a plurality of first contact assistants 81, and a second contact assistant 82 are formed on the passivation layer 180. They are made of, but not limited to, transparent conductor such as ITO or IZO or reflective conductor such as Ag, Al, Cr, or alloys thereof.

A pixel electrode 191 is physically and electrically connected to the drain electrode 175 through the second contact hole 185 such that the pixel electrode 191 receives data voltages from the drain electrode 175. The pixel electrode 191 is supplied with the data voltages and generates an electric field in cooperation with a common electrode 270 of the common electrode panel 200. The common electrode 270 is supplied with a common voltage, which determines the orientations of liquid crystal molecules of a liquid crystal layer 3 disposed between the pixel electrode 191 and the common electrode 270. The pixel electrode 191 and the common electrode 270 form a capacitor referred to as a "liquid crystal capacitor," which stores applied voltages after the TFT turns off.

The pixel electrode 191 overlaps the storage electrode line 131 including the pair of first and second storage electrodes 133a and 133b such that the pixel electrode 191 fully covers a portion of a stem of the storage electrode line 131. The left and right edges of the pixel electrode 191 are disposed on the pair of first and second storage electrodes 133a and 133b. The pixel electrode 191 and the drain electrode 175 connected thereto and form an additional capacitor referred to as a "storage capacitor" with the storage electrode line 131, which enhances the voltage storing capacity of the liquid crystal capacitor.

In addition, the pixel electrode 191 also overlaps the gate line 121 disposed adjacent to the pixel electrode 191 such that the aperture ratio is increased. An upper edge of the pixel electrode 191 is disposed on the gate line 121 and extends along a lower edge of the gate line 121.

An overpass 83 crosses over the gate line 121 and is connected to the exposed portions of the storage electrode line 131 and the exposed linear branches of the free end portions of the first storage electrode 133a through the fourth contact hole 183a and the fifth contact hole 183b, respectively, which are disposed opposite each other with respect to the gate line 121. The storage electrode line 131 including the storage electrodes 133a and 133b along with the overpass 83 can be used for repairing defects in the gate line 121, the data line 171, or the TFTs.

A first contact assistant 81 and a second contact assistant 82 are connected to the end portion 129 of the gate line 121 and the end portion 179 of the data line 171 through the third contact hole 181 and the first contact hole 182, respectively. The first contact assistant 81 and the second contact assistant 82 protect the end portions 129 and 179 and enhance the adhesion between the end portions 129 and 179 and external devices.

An alignment layer 11 that may be homogeneous or homeotropic is formed on the pixel electrode 191 and the passivation layer 180.

Figure 4:
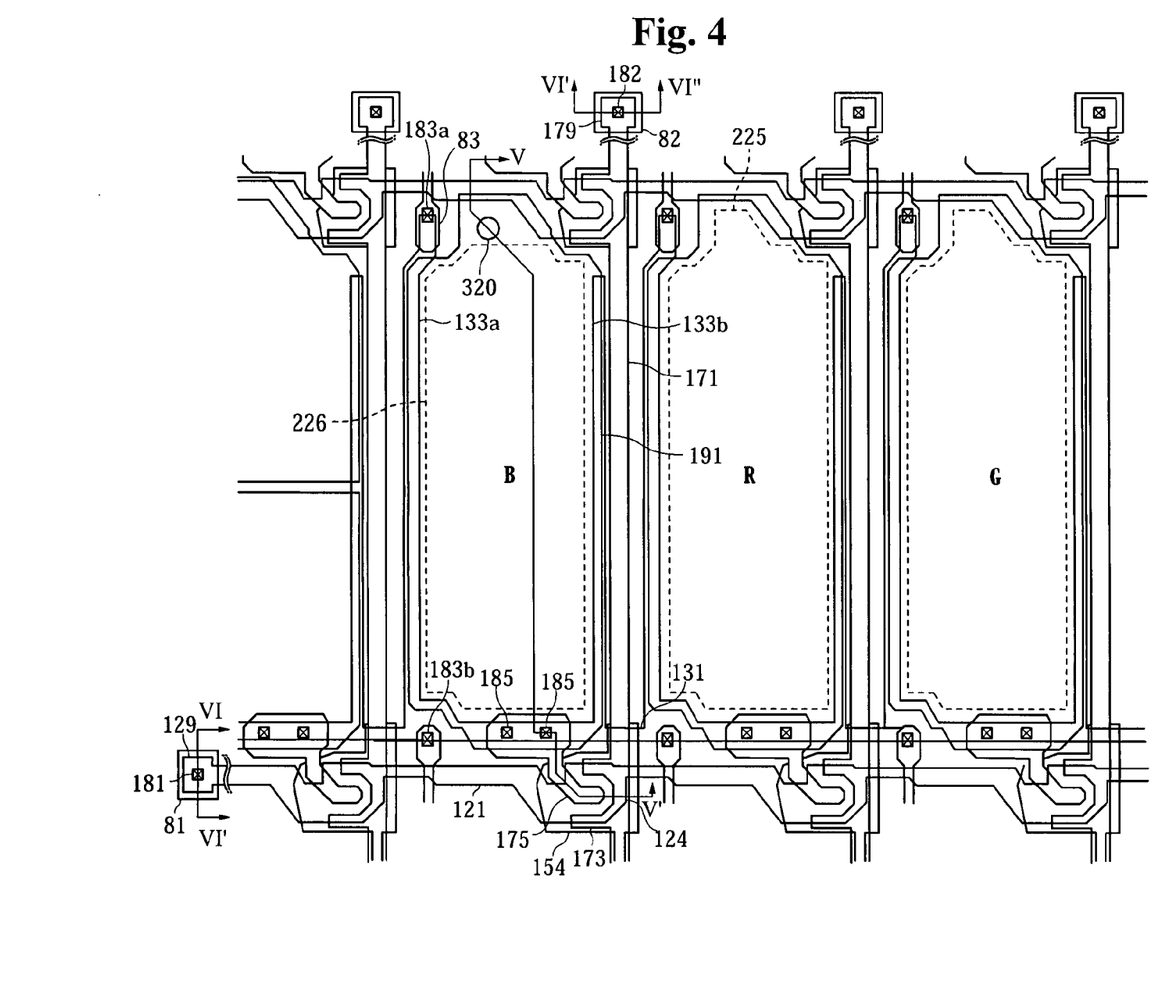
FIG. 4 is a layout view of an LCD according to another exemplary embodiment of the present invention.

The description of the common electrode panel 200 follows with reference to FIGS. 2-4.

A light blocking member 220 referred to as a black matrix for preventing light leakage is formed on an insulating substrate 210 which may be made of transparent glass or plastic. The light blocking member 220 has a first opening 225 and a second opening 226 that face the pixel electrode 191. It is contemplated that the light blocking member 220 may have a plurality of first and second openings. The boundary of the first opening 225 and the second opening 226 are disposed on the pixel electrode 191 and extends along the boundary of the pixel electrode 191. All the edges of the first opening 225 are disposed close to edges of the pixel electrode 191 to expose an area between a fixed end portion of a first storage electrode and the gate electrode 124. However, the second opening 226 has an upper edge spaced apart from an upper edge of a pixel electrode 191 such that the light blocking member 220 covers an area between a fixed end portion of a first storage electrode and the gate electrode 124. The light blocking member 220 also covers a boundary of a display area that is provided with the pixel electrode 191.

A plurality of color filters 230 are also formed on the substrate 210 and disposed substantially in the area enclosed by the light blocking member 220 such that edges of the color filter 230 are disposed on the light blocking member 220. A color filter 230 may extend substantially along the longitudinal direction along the pixel electrode 191. The color filter 230 represents one of the primary colors such as red R, green G and blue B as shown in FIG. 1.

An overcoat 250 is formed on the color filters 230 and the light blocking member 220. The overcoat 250 is, for example, made of an (organic) insulator and it prevents the color filters 230 from being exposed and provides a flat surface.

The common electrode 270 is formed on the overcoat 250. The common electrode 270 is made of, including but not limited to, a transparent conductive material such as ITO and IZO.

A plurality of columnar spacers 320 are formed on the common electrode 270 and disposed opposite the light blocking member 220. A columnar spacer 320 is, for example, made of an elastic insulating material and has contact portions that contact the TFT array panel 100, to provide support for the TFT array panel 100, and the common electrode panel 200. The spacer 320 faces the pixel electrode 191 and it is disposed on an area enclosed by a fixed end portion of a first storage electrode, the gate line 121, the gate electrode 124, and an upper edge of the second opening 226.

However, it will be appreciated that the place where a spacer 320 contacts on the TFT array panel 100 is not limited to the above-described location.

In an exemplary embodiment, the spacer 320 may contact any place of the TFT array panel 100 that is relatively low as compared with other places on the TFT array panel 100 and may have a flat surface. In this configuration, although the contact portions of the spacer 320 may slide out of the correct positions due to a pressure or an impact exerted on the panels 100 and 200, the contact portions can return to the correct positions. On the contrary, if a spacer 320 is disposed on a higher place relative to other places on the TFT array panel 100 and the higher place occupies a small area, if the contact portion of the spacer 320 slides out of the higher place to reach a lower place it may not return to its initial position due to the step between the higher place and the lower place. The failure of the spacer 320 to return to the lower place may cause light leakage.

In another exemplary embodiment, the contact place is disposed near opaque members, such as the gate line 121, the storage electrode 131, the data line 171, etc., in order to reduce light leakage.

In yet a further exemplary embodiment, the spacers 320 are disposed on the blue color filters B as shown in FIG. 1 since human eyes are less sensitive to blue color as compared with red and green colors.

An alignment layer 21 that may be homogeneous or homeotropic is formed on the common electrode 270 and the spacer 320.

In an exemplary embodiment, a pair of polarizers 12 and 22 are provided on outer surfaces of the panels 100 and 200, respectively. However, it is also contemplated that one of the polarizers 12 and 22 may be omitted when the LCD device is a reflective LCD device.

The LCD device may further include a retardation film (not shown) for compensating the retardation of the LC layer 3. The retardation film has birefringence and gives a retardation opposite to that given by the LC layer 3.

The LCD device may also further include a backlight unit (not shown) supplying light to the LC layer 3 through the polarizers 12 and 22, the retardation film, and the panels 100 and 200.

The LC layer 3 may have positive or negative dielectric anisotropy and it may be subjected to either a horizontal alignment or a vertical alignment in absence of an electric field.

An LCD device according to another exemplary embodiment of will now be described in further detail with reference to FIGS. 4, 5 and 6.

Figure 5:
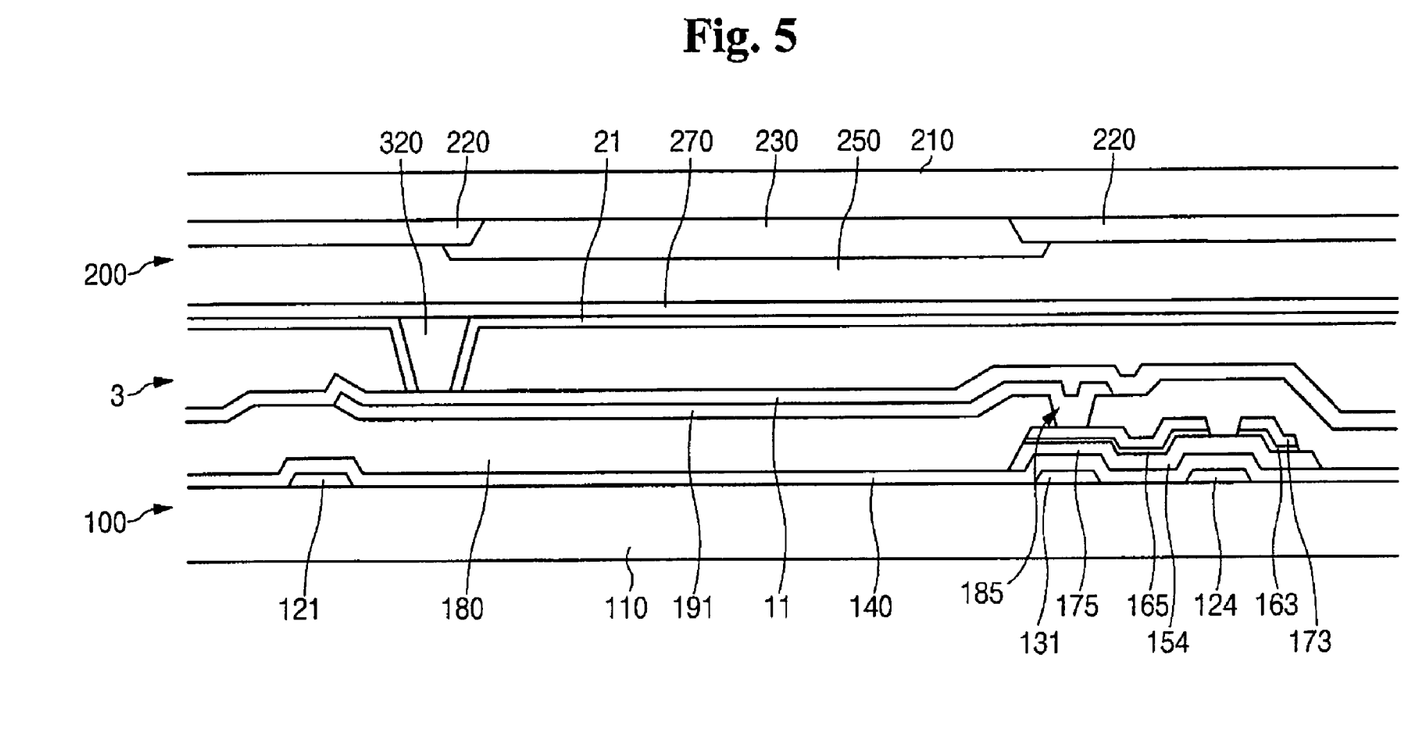
FIG. 5 is a sectional view of the LCD shown in FIG. 4 taken along line V-V'.
Figure 6:
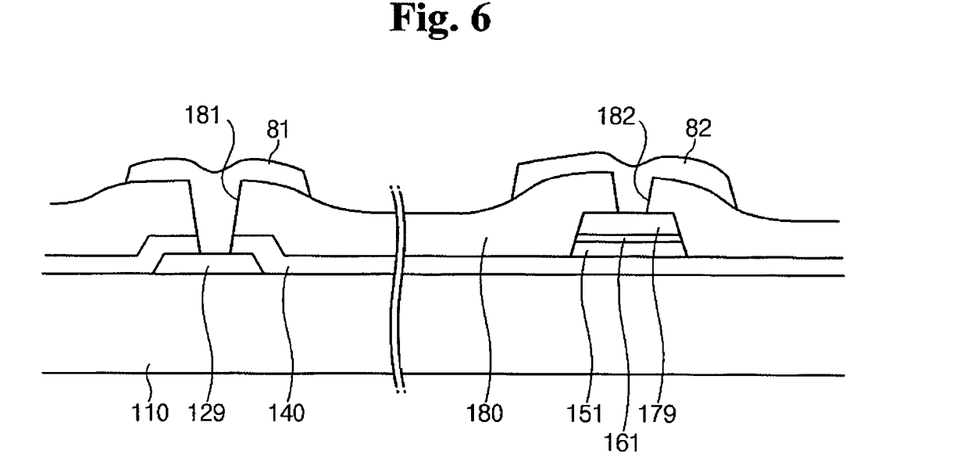
FIG. 6 is a sectional view of the LCD shown in FIG. 4 taken along line VI-VI'-VI"

FIG. 4 is a layout view of an LCD device according to another exemplary embodiment and FIGS. 5 and 6 are sectional views of the LCD device shown in FIG. 4 taken along lines V-V' and VI-VI'-VI", respectively.

Referring to FIGS. 4-6, an LCD device according to this exemplary embodiment also includes a TFT array panel 100, a common electrode panel 200, and a LC layer 3 interposed between the panels 100 and 200.

Regarding the TFT array panel 100, the gate line 121 including the gate electrode 124 and the end portion 129, and the storage electrode line 131 including the storage electrodes 133a and 133b are formed on the substrate 110. The gate insulating layer 140, the semiconductor stripe 151 including the projection 154, and the ohmic contacts 161 and 165 including the projection 163 are sequentially formed on the gate line 121 and the storage electrodes line 131. The data line 171 including the source electrode 173 and the end portion 179 and the drain electrode 175 are formed on the ohmic contacts 161 and 165. The passivation layer 180 is formed on the data line 171, the drain electrode 175, and exposed portions of the semiconductors 154. The third contact hole 181, the first contact hole 182, and the second contact hole 185 are provided at the passivation layer 180 and the gate insulating layer 140. The pixel electrode 191, the overpass 83, the first contact assistant 81, and the second contact assistant 82 are formed on the passivation layer 180 and the alignment layer 11 is coated thereon.

Regarding the common electrode panel 200, a light blocking member 220, the color filter 230, the overcoat 250, the common electrode 270, the columnar spacer 320, and the alignment layer 21 are formed on the insulating substrate 210.

In an alternative exemplary embodiment of the LCD device, the semiconductor stripe 151 have almost the same planar shape as the data line 171 and the drain electrode 175 as well as the underlying ohmic contacts 161 and 165. However, the semiconductor 151 includes some exposed portions, which are not covered with the data line 171 and the drain electrode 175, such as portions located between the source electrode 173 and the drain electrode 175.

A manufacturing method of the TFT array panel according to an exemplary embodiment simultaneously forms the data line 171, the drain electrode 175, the semiconductor 151, and the ohmic contacts 161 and 165 using one photolithography step.

In another exemplary embodiment, a photoresist masking pattern for the photolithography process may have a position-dependent thickness, and in particular, it has thicker portions and thinner portions. The thicker portions are located on wire areas that will be occupied by the data line 171 and the drain electrode 175 and the thinner portions are located on channel areas of TFTs.

The position-dependent thickness of the photoresist may be obtained by several techniques, including but not limited to, providing translucent areas on the exposure mask as well as transparent areas and light blocking opaque areas. The translucent areas may have a slit pattern or a lattice pattern. Alternatively, the translucent film may be a thin film(s) with intermediate transmittance or intermediate thickness. When using a slit pattern, the width of the slits or the distance between the slits may be smaller than the resolution of a light exposer used for the photolithography. In another exemplary embodiment a reflowable photoresist may be used. Once a photoresist pattern made of a reflowable material is formed using a normal exposure mask with transparent areas and opaque areas, it is subject to a reflow process including flow onto areas without the photoresist. The reflow process may be used to form thin portions. In another exemplary embodiment, the manufacturing process may be simplified by omitting a photolithography step.

Many of the above-described features of the LCD device shown in FIGS. 1-3 may be applied to the LCD device shown in FIGS. 4-6.

An LCD device according to another exemplary embodiment of the present invention will now be described in further detail with reference to FIG. 7.

Figure 7:
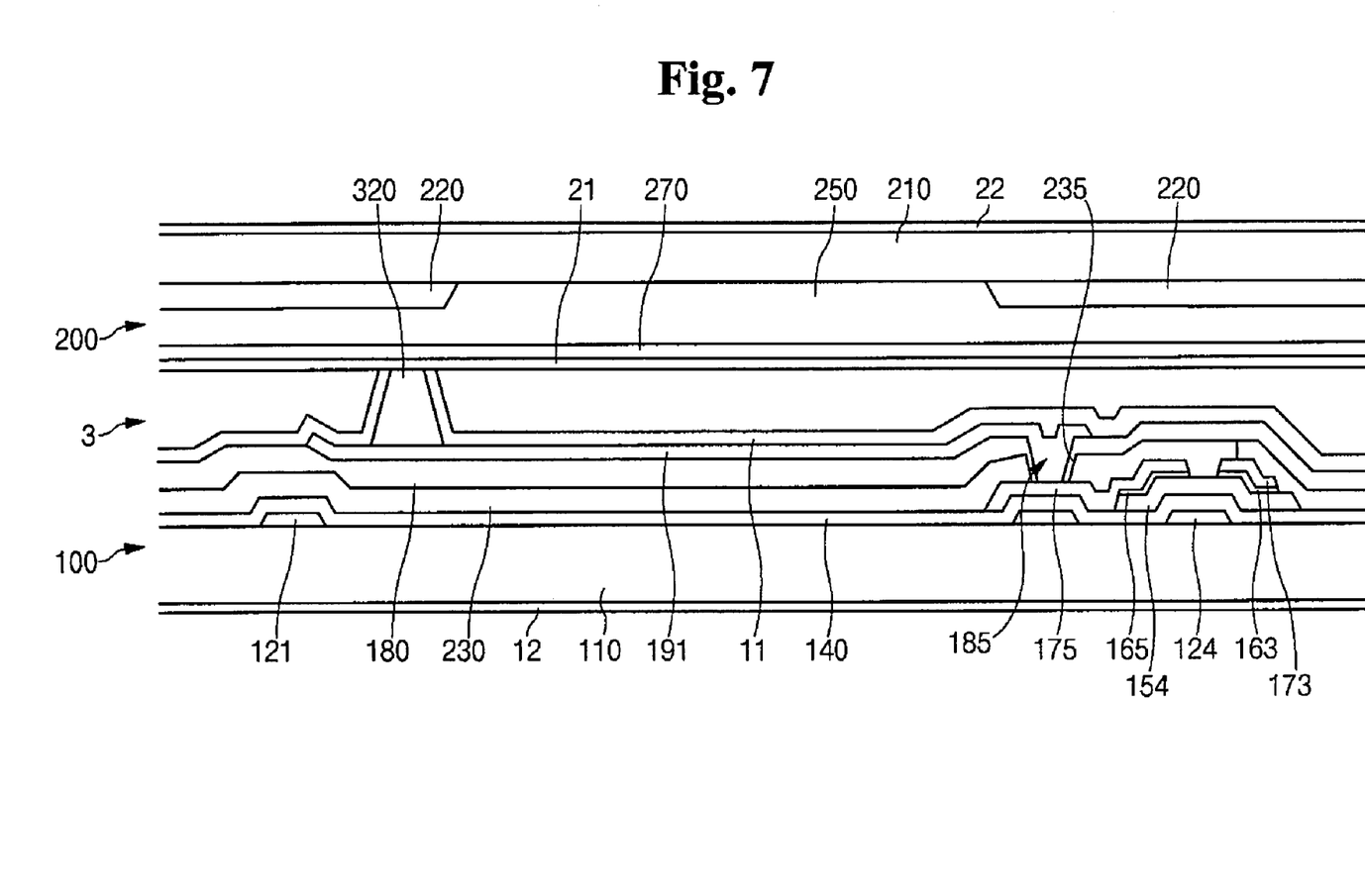
FIG. 7 is a sectional view of the LCD shown in FIG. 1 taken along line II-II'.

FIG. 7 is a sectional view of the LCD device shown in FIG. 1 taken along line II-II'.

Referring to FIG. 7, the LCD device includes the TFT array panel 100, the common electrode panel 200, the LC layer 3 interposed between the panels 100 and 200, and a pair of polarizers 12 and 22 disposed on outer surfaces of the panels 100 and 200.

Regarding the TFT array panel 100, the gate line 121 including the gate electrode 124 and the end portion 129, and the storage electrode line 131 including the storage electrodes 133a and 133b are formed on the substrate 110. The gate insulating layer 140, the semiconductor stripe 151 including the projection 154, and the ohmic contacts 161 and 165 including the projection 163 are sequentially formed on the gate line 121 and the storage electrodes line 131. The data line 171 including the source electrode 173, the end portion 179, and the drain electrode 175 are formed on the ohmic contacts 161 and 165 and the gate insulating layer 140. The passivation layer 180 is formed on the data line 171, the drain electrode 175, and exposed portions of the semiconductor 154. The third contact hole 181, the first contact hole 182, and the second contact hole 185 are provided at the passivation layer 180 and the gate insulating layer 140. The pixel electrode 191, the overpass 83, the first contact assistants 81, and the second contact assistant 82 are formed on the passivation layer 180, and the alignment layer 11 is coated thereon.

In an exemplary embodiment of the common electrode panel 200, the light blocking member 220, the color filter 230, the overcoat 250, the common electrode 270, and the alignment layer 21 are formed on the insulating substrate 210. In an alternative exemplary embodiment of the LCD device, the columnar spacer 320 may be formed on the pixel electrode 191, which is formed on the TFT array panel 100. Additionally, the TFT array panel 100 may include the color filter 230 that are disposed under the passivation layer 180 and the common electrode panel 200 may not have the color filter 230. In this exemplary embodiment, the overcoat 250 may be removed from the common electrode panel 200.

The color filter 230 may be disposed between two adjacent data lines 171 and have a through-hole 235 through which the contact hole 185 pass through. The color filters 230 are not provided on peripheral areas provided with the end portions 129 and 179 of the signal lines 121 and 171.

The color filter 230 may extend along a longitudinal direction to form a stripe and the edges of two adjacent color filters 230 may exactly match with each other on the data line 171. However it is also contemplated that the color filters 230 may overlap each other and block the light leakage between two of the pixel electrodes 191. Furthermore the color filters may also be spaced apart from each other.

In an exemplary embodiment, the color filter 230 may be disposed on the passivation layer 180. However it is also contemplated that the passivation layer 180 may be omitted.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A liquid crystal display device comprising:
   a first panel comprising a flat surface plate-like conductor first portion and a bar-like conductor second portion;
   a plurality of signal lines disposed in the second portion;
   a second panel facing the first panel;
   a pixel electrode formed on the first panel;
   a spacer disposed between the first panel and the second panel, contacting the flat surface plate-like conductor first portion of the first panel, overlapping the pixel electrode, and without overlapping the signal lines; and
   wherein the second panel comprises a light blocking member that faces the bar-like conductor second portion of the first panel and partly faces the flat surface plate-like conductor portion of the first panel, and
   wherein the spacer overlaps the light blocking member.

2. The liquid crystal display device of claim 1, wherein the spacer is formed on the second panel.

3. The liquid crystal display device of claim 1, wherein the spacer is disposed near the second portion of the first panel.

4. The liquid crystal display device of claim 1, wherein the second portion is opaque and the spacer is disposed near the second portion of the first panel.

5. The liquid crystal display device of claim 4, wherein the second portion of the first panel encloses the first portion of the first panel.

6. The liquid crystal display device of claim 5, wherein the first portion of the first panel comprises a pixel electrode and the second portion of the first panel comprises a signal line.

7. The liquid crystal display device of claim 6, wherein the second panel comprises a common electrode generating an electric field in cooperation with the pixel electrode.

8. The liquid crystal display device of claim 7, wherein at least one of the pixel electrode and the common electrode is transparent.

9. The liquid crystal display device of claim 7, further comprising a color filter disposed on one of the first panel and the second panel.

10. The liquid crystal display device of claim 9, wherein the color filter comprises a red filter, a green filter, and a blue filter.

11. The liquid crystal display device of claim 10, wherein the spacer overlaps the blue filter.

12. The liquid crystal display device of claim 1, wherein the second panel has a plurality of openings, at least one of the plurality of openings comprising smaller opening than others.

13. The liquid crystal display device of claim 12, wherein the smaller opening includes the spacer.

* * * * *